US012609337B2

(12) United States Patent
Kato

(10) Patent No.: US 12,609,337 B2
(45) Date of Patent: Apr. 21, 2026

(54) FUEL CELL SYSTEM

(71) Applicant: HONDA MOTOR CO., LTD., Tokyo (JP)

(72) Inventor: Koichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 569 days.

(21) Appl. No.: 18/113,346

(22) Filed: Feb. 23, 2023

(65) Prior Publication Data

US 2023/0387434 A1 Nov. 30, 2023

(30) Foreign Application Priority Data

Mar. 10, 2022 (JP) ................................ 2022-037141

(51) Int. Cl.
| | |
|---|---|
| *H01M 8/04* | (2016.01) |
| *H01M 8/04082* | (2016.01) |
| *H01M 8/0438* | (2016.01) |
| *H01M 8/04537* | (2016.01) |
| *H01M 8/04664* | (2016.01) |
| *H01M 8/04746* | (2016.01) |
| *H01M 8/04858* | (2016.01) |
| *H01M 8/2457* | (2016.01) |

(52) U.S. Cl.
CPC ... *H01M 8/04686* (2013.01); *H01M 8/04201* (2013.01); *H01M 8/04388* (2013.01); *H01M 8/04589* (2013.01); *H01M 8/04619* (2013.01); *H01M 8/04753* (2013.01); *H01M 8/0494* (2013.01); *H01M 8/2457* (2016.02)

(58) Field of Classification Search
CPC .......... H01M 8/04686; H01M 8/2457; H01M 8/04201; H01M 8/04388; H01M 8/04589; H01M 8/04619; H01M 8/04753; H01M 8/0494

USPC .......................................................... 429/400
See application file for complete search history.

(56) References Cited

U.S. PATENT DOCUMENTS

| | | | |
|---|---|---|---|
| 2019/0393524 A1* | 12/2019 | Jin ..................... | H01M 8/04589 |
| 2020/0153012 A1* | 5/2020 | Kim ................... | H01M 8/04992 |
| 2020/0232603 A1 | 7/2020 | Kawase et al. | |

FOREIGN PATENT DOCUMENTS

| | | |
|---|---|---|
| JP | 2004-031232 A | 1/2004 |
| JP | 2005-325950 A | 11/2005 |
| JP | 2007-048519 A | 2/2007 |

(Continued)

OTHER PUBLICATIONS

Office Action dated Nov. 28, 2023 issued in the corresponding Japanese Patent Application No. 2022-037141 with the English machine translation thereof.

*Primary Examiner* — James M Erwin
(74) *Attorney, Agent, or Firm* — Carrier, Shende & Associates P.C.; Joseph P. Carrier; Fulchand P. Shende

(57) ABSTRACT

If a difference between pressure values detected by a plurality of pressure detectors is equal to or greater than a predetermined value, a anode pressure in the fuel gas supply pipe is estimated based on a supply situation of the fuel gas supplied from a pressure regulator and a consumption situation of the fuel gas in a fuel cell stack, and it is determined that a pressure detector detecting a pressure value closer to an estimated pressure value is a normal pressure detector. Thereafter, a power generation operation of a fuel cell system is continued based on the pressure value of the pressure detector determined to be normal.

7 Claims, 5 Drawing Sheets

(56)            References Cited

FOREIGN PATENT DOCUMENTS

| | | |
|---|---|---|
| JP | 2007-172888 A | 7/2007 |
| JP | 2019-036440 A | 3/2019 |
| JP | 2020-118174 A | 8/2020 |

* cited by examiner

FIG. 2

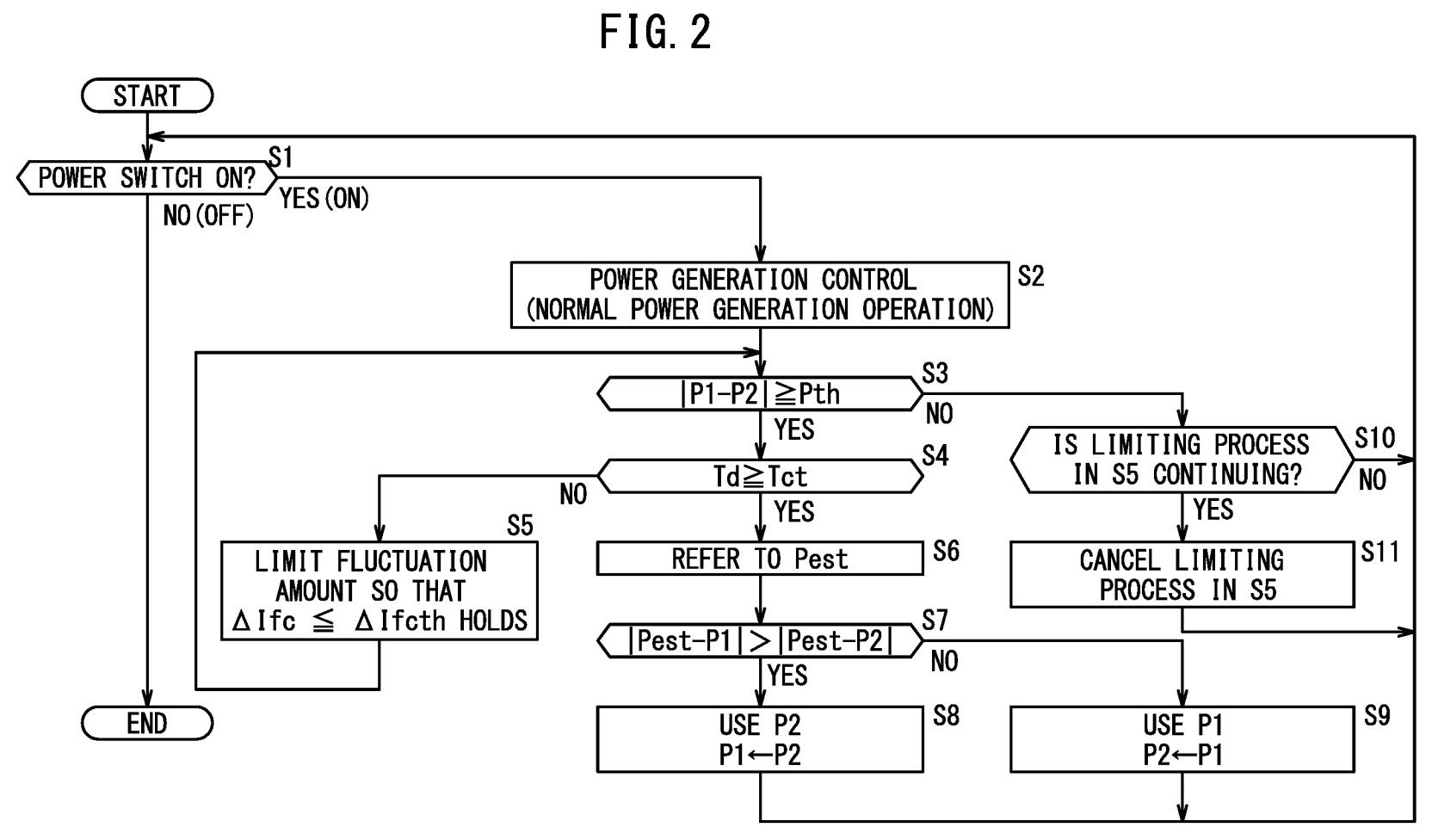

START

S1   POWER SWITCH ON?

NO (OFF) → END

YES (ON)

S2   POWER GENERATION CONTROL (NORMAL POWER GENERATION OPERATION)

S3   $|P1-P2| \geqq Pth$

NO → S10

YES

S4   $Td \geqq Tct$

NO → S5   LIMIT FLUCTUATION AMOUNT SO THAT $\Delta Ifc \leqq \Delta Ifcth$ HOLDS

YES

S6   REFER TO Pest

S7   $|Pest-P1| > |Pest-P2|$

YES → S8   USE P2   $P1 \leftarrow P2$

NO

S10   IS LIMITING PROCESS IN S5 CONTINUING?

YES → S11   CANCEL LIMITING PROCESS IN S5

NO

S9   USE P1   $P2 \leftarrow P1$

FIG. 5

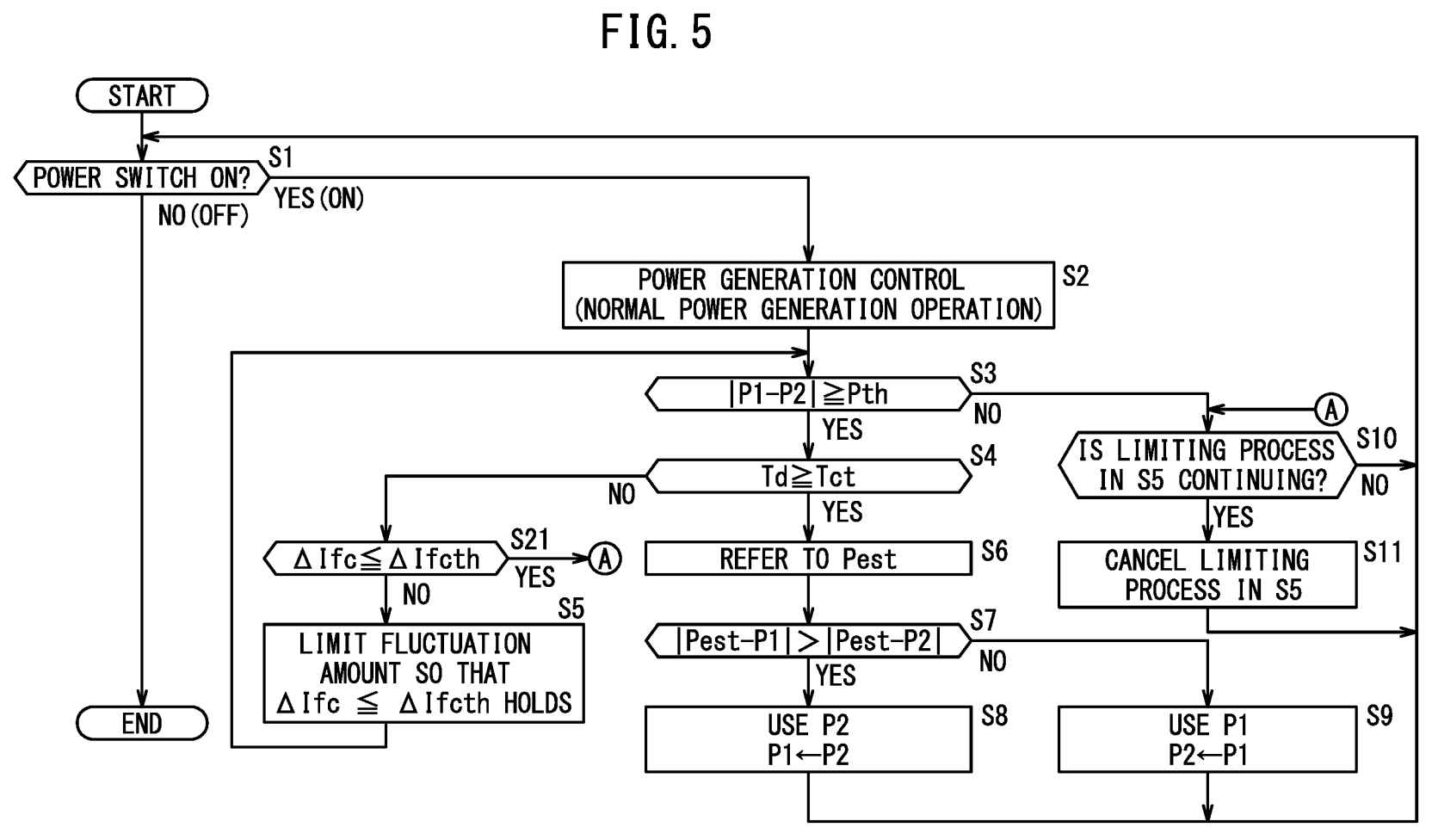

START

S1 — POWER SWITCH ON?
- YES (ON)
- NO (OFF)

S2 — POWER GENERATION CONTROL (NORMAL POWER GENERATION OPERATION)

S3 — $|P1-P2| \geqq Pth$
- YES
- NO

S4 — $Td \geqq Tct$
- YES
- NO

S6 — REFER TO Pest

S7 — $|Pest-P1| > |Pest-P2|$
- YES
- NO

S8 — USE P2 $P1 \leftarrow P2$

S9 — USE P1 $P2 \leftarrow P1$

S10 — IS LIMITING PROCESS IN S5 CONTINUING?
- YES
- NO

S11 — CANCEL LIMITING PROCESS IN S5

S21 — $\Delta Ifc \leqq \Delta Ifcth$
- YES
- NO

S5 — LIMIT FLUCTUATION AMOUNT SO THAT $\Delta Ifc \leqq \Delta Ifcth$ HOLDS

A

END

FUEL CELL SYSTEM

CROSS-REFERENCE TO RELATED APPLICATIONS

This application is based upon and claims the benefit of priority from Japanese Patent Application No. 2022-037141 filed on Mar. 10, 2022, the contents of which are incorporated herein by reference.

BACKGROUND OF THE INVENTION

Field of the Invention

The present invention relates to a fuel cell system including a fuel cell stack for generating electric power by electrochemical reactions between an oxygen-containing gas and a fuel gas.

Description of the Related Art

In recent years, research and development have been conducted on fuel cells that contribute to energy efficiency in order to ensure that more people have access to affordable, reliable, sustainable and modern energy.

For example, JP 2020-118174 A discloses a technique related to a high pressure container system in a fuel cell system. In the fuel cell system, a high pressure fuel gas supplied from a high pressure container is supplied to a fuel cell stack via a pressure regulating valve. A plurality of pressure sensors are disposed downstream of the pressure regulating valve and one pressure sensor is disposed upstream of the pressure regulating valve to monitor the internal pressure of the high pressure container.

In this technique, if a difference between detected pressure values of a plurality of downstream pressure sensors arranged on the downstream side of the pressure regulating valve is greater than a predetermined value, it is determined that any one of the downstream pressure sensors is abnormal. If it is determined that any one of the downstream pressure sensors is abnormal, the supply of the fuel gas from the high pressure container is cut off when the pressure values of the plurality of downstream pressure sensors become equal to or less than the downstream threshold value or when the pressure value of the upstream pressure sensor becomes equal to or less than the upstream threshold value.

SUMMARY OF THE INVENTION

In the technique related to the fuel cell, there is a problem of operation stoppage since it is desired to continue the power generation operation of the fuel cell system without stopping it.

An object of the present invention is to solve the above-described problems.

A fuel cell system according to one embodiment of the present invention includes a fuel cell stack configured to generate electric power by an electrochemical reaction between an oxygen-containing gas and a fuel gas. The system includes a high pressure container in which the fuel gas having high pressure is stored, a pressure regulator configured to regulate pressure of the fuel gas discharged from the high pressure container and supply the regulated fuel gas to the fuel cell stack via a fuel gas supply pipe, a plurality of pressure detectors provided at the fuel gas supply pipe and each configured to measure the pressure of the fuel gas in the fuel gas supply pipe, and a control device configured to control the pressure regulator, wherein in a case where a difference between pressure values detected by the plurality of pressure detectors is equal to or greater than a predetermined value, control device estimates a pressure value in the fuel gas supply pipe based on a supply situation of the fuel gas supplied from the pressure regulator to the fuel cell stack and a consumption situation of the fuel gas in the fuel cell stack, and determines that a pressure detector detecting a pressure value closer to an estimated pressure value is a normal pressure detector, and thereafter continues a power generation operation of the fuel cell stack based on the pressure value of the pressure detector determined to be normal.

According to the present invention, if the difference between the pressure values detected by the plurality of pressure detectors is equal to or greater than the predetermined value, in other words, if any of the pressure detectors has transitioned to an abnormal state, a normal pressure detector can be accurately determined by comparing the pressure values detected by the plurality of pressure detectors with the estimated pressure value estimated based on the supply situation of the fuel gas to the fuel cell stack and the consumption situation of the fuel gas in the fuel cell stack.

In the case where any pressure detector among the plurality of pressure detectors transitions to an abnormal state, the power generation operation of the fuel cell system can be continued, using a normal pressure detector. This contributes to energy efficiency as well.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a flowchart for explaining an operation of the fuel cell system;

FIG. 5 is a flowchart for explaining an operation of a modification.

DETAILED DESCRIPTION OF THE INVENTION

Embodiment

[Configuration]

Figure 1:
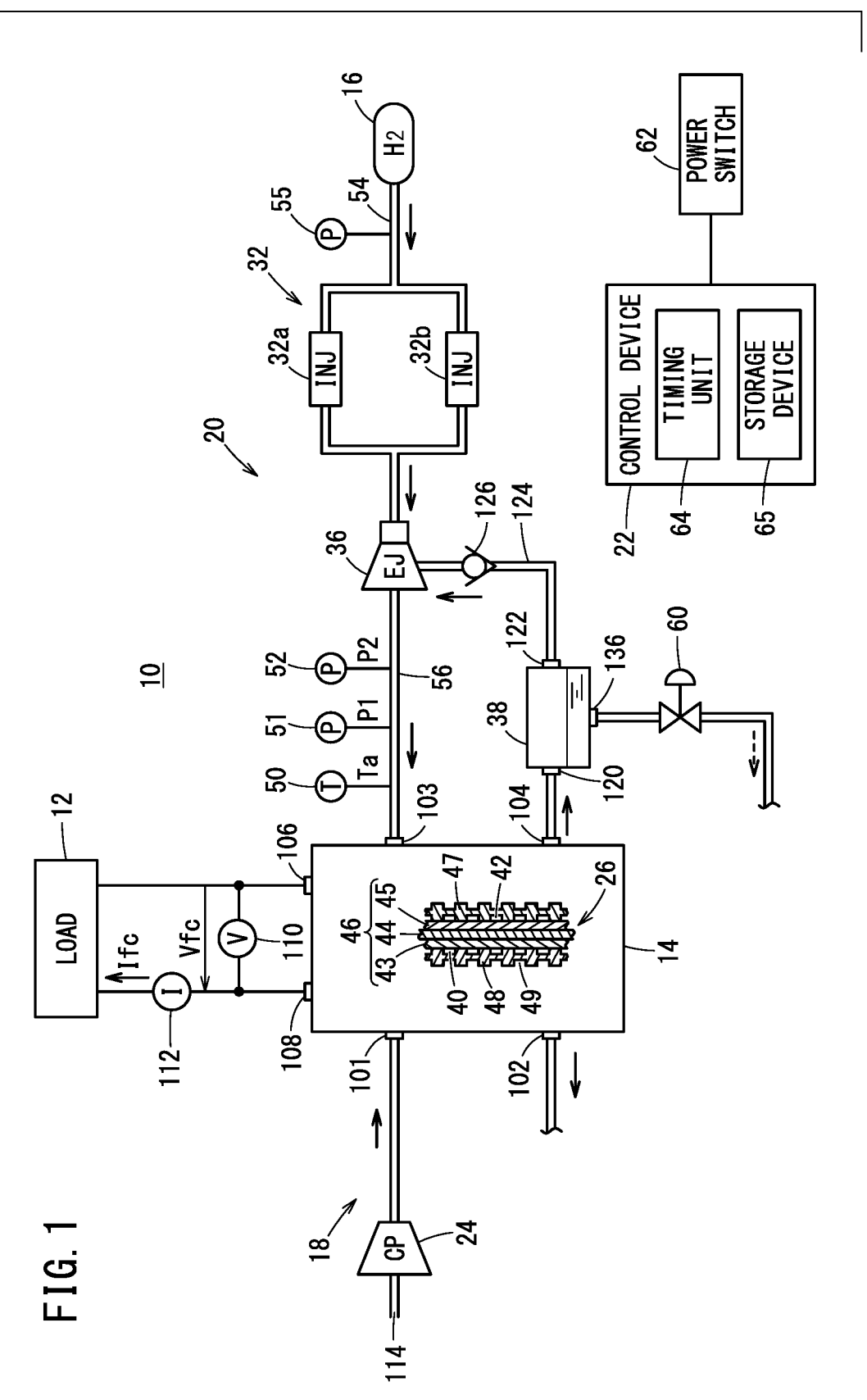
FIG. 1 is a schematic configuration diagram of a fuel cell system according to an embodiment in which a fuel cell stack is electrically connected to a load.

FIG. 1 is a schematic configuration diagram of a fuel cell system 10 according to an embodiment in which a fuel cell stack (also simply referred to as a fuel cell) 14 is electrically connected to a load 12.

Here, the fuel cell system 10 can be incorporated for use in a mobile body such as a fuel cell vehicle, a ship, an aircraft, or a robot in which the load 12 is, for example, a motor. The fuel cell system 10 can be used in a stand-alone system such as a plant.

The fuel cell system 10 includes a fuel cell stack 14, a high pressure container 16 which is a hydrogen tank, an oxygen-containing gas supply device 18, a fuel gas supply device 20, and a control device 22 for controlling these components.

The control device 22 may be divided into two or more control devices instead of one control device.

The oxygen-containing gas supply device 18 includes a compressor (CP) 24.

The fuel gas supply device 20 includes pressure regulators 32 (32a, 32b) each of which is an injector (INJ), an ejector 36, and a gas-liquid separator 38. The pressure regulators 32 may be replaced by a pressure reducing (regulating) valve, or may be at least one pressure regulator.

The fuel cell stack 14 is configured as a stack of solid polymer electrolyte power generation cells 26. Each of the power generation cells 26 includes a membrane electrode assembly 46 including a cathode 43 and an anode 45 that sandwiches a solid polymer electrolyte membrane 44, and a pair of separators 47 and 48 sandwiching the membrane electrode assembly 46.

On a surface of one separator 48 that faces the membrane electrode assembly 46, a cathode flow field (an oxygen-containing gas flow field) 40 in communication with an oxygen-containing gas inlet connection port 101 and an oxygen-containing gas outlet connection port 102 is formed.

A flow field 49 for heat exchange medium is formed on another surface of the separator 48.

On the side of the other separator 47 that faces the membrane electrode assembly 46, an anode flow field (a fuel gas flow field) 42 in communication with a fuel gas inlet connection port 103 and a fuel gas outlet connection port 104 is formed.

At the anode 45, when the fuel gas (hydrogen) is supplied, hydrogen ions are generated from hydrogen molecules by electrode reactions on the catalyst, and the hydrogen ions permeate through the solid polymer electrolyte membrane 44 and move to the cathode 43, while electrons are released from the hydrogen molecules.

The electrons released from the hydrogen molecules move from a negative electrode terminal 106 to the cathode 43 through the load 12 and a positive electrode terminal 108.

At the cathode 43, the hydrogen ions and the electrons react with oxygen contained in the oxygen-containing gas supplied through the compressor 24, by the action of the catalyst to generate water.

A voltage detector 110, which is a voltage sensor that detects the power generation voltage Vfc, is provided between wires that connect the positive electrode terminal 108 and the negative electrode terminal 106 to the load 12. Furthermore, a current detector 112, which is a current sensor that detects the power generation current Ifc, is provided in the wiring that connects the positive electrode terminal 108 and the load 12.

The compressor 24 suctions outside air (atmosphere, air) from an outside air intake port 114, supplies the pressurized oxygen-containing gas (supercharged air) from the oxygen-containing gas inlet connection port 101 to the cathode flow field 40 in the fuel cell stack 14, and causes the oxygen-containing gas to flow through the cathode flow field 40.

The high pressure container 16 is a container including a solenoid shut-off valve, and compresses highly pure hydrogen under high pressure, and stores the compressed hydrogen.

The fuel gas discharged from the high pressure container 16 is supplied to the anode flow field 42 of the fuel cell stack 14 through the pressure regulators 32 (32a, 32b) provided in parallel with each other in a fuel gas discharge pipe 54 and the ejector 36, a fuel gas supply pipe 56, and the fuel gas inlet connection port 103, to flow through the anode flow field 42.

The fuel gas discharge pipe 54 is provided with a pressure detector 55 which is a pressure sensor for detecting the pressure of the fuel gas discharged from the high pressure container 16 to the fuel gas discharge pipe 54.

The fuel gas supply pipe 56 is provided with a temperature detector 50 which is a temperature sensor for detecting the temperature of the fuel gas supplied to the fuel cell stack 14, and pressure detectors 51 and 52 which are pressure sensors provided alongside for detecting the pressure of the fuel gas which has been regulated (decompressed) by the pressure regulators 32 and is supplied to the fuel cell stack 14. The pressure detectors 51 and 52 have the same specifications. The specifications of the pressure detectors 51 and 52 may not be the same.

The pressure detected by the pressure detector 51 is referred to as a pressure value P1, and the pressure detected by the pressure detector 52 is referred to as a pressure value P2. The pressure value in the fuel gas supply pipe 56 is referred to as an anode pressure Pa. If neither of the pressure detectors 51 and 52 has failed, the anode pressure Pa is calculated (obtained) by the control device 22 as an average of the pressure value P1 detected by the pressure detector 51 and the pressure value P2 detected by the pressure detector 52 according to following equation (1). Detection (acquisition) may be performed by either one of them.

$$Pa = (P1 + P2)/2 \qquad (1)$$

The fuel cell stack 14 generates electric power by electrochemical reactions between the oxygen-containing gas and the fuel gas flowing therethrough, and supplies the generated electric power Pfc to the load 12 through the positive electrode terminal 108 and the negative electrode terminal 106.

The oxygen-containing gas from which a portion of oxygen has been consumed in the fuel cell stack 14 is discharged to the outside through the oxygen-containing gas outlet connection port 102 as a nitrogen-rich oxygen-containing off-gas.

On the other hand, the fuel gas which is the hydrogen-containing gas from which a part of the fuel gas is consumed in the fuel cell stack 14 flows to an inlet 120 of the gas-liquid separator 38 via the fuel gas outlet connection port 104 as the fuel off-gas. The fuel off-gas which is the hydrogen-containing gas is supplied from the anode flow field 42 to the gas-liquid separator 38.

The gas-liquid separator 38 separates the fuel off-gas into a gas component and a liquid component (liquid water). The gas component of the fuel off-gas is discharged from a gas exhaust port 122 of the gas-liquid separator 38 and supplied to a suction port of the ejector 36 through a reed valve 126 in a circulation pipe 124.

The liquid component of the fuel off-gas flows from a liquid removal port 136 of the gas-liquid separator 38 through a drain valve 60, is mixed with the oxygen-containing off-gas, and is discharged to the outside through a diluter.

The above-described components of the fuel cell system 10 are collectively controlled by the control device 22.

The control device 22 is constituted by an electronic control unit (ECU). The ECU is configured by a computer including one or more processors (CPUs), a memory, an input/output interface, and an electronic circuit. The one or more processors (CPUs) execute an unillustrated program (computer-executable instructions) stored in the memory.

The control device 22 includes a timing unit 64 that serves as a timer.

The processor (CPU) of the control device 22 performs operation control of the fuel cell system 10 by executing calculation in accordance with the program.

A power switch 62 for turning on and off the fuel cell system 10 is connected to the control device 22. The power switch 62 starts or continues (ON), and terminates (OFF) the power generation operation of the fuel cell stack 14 of the fuel cell system 10.

[Operation]

The fuel cell system 10 according to the present embodiment is configured basically as described above. Hereinafter, the operation will be described with reference to the flowchart of FIG. 2. The process according to the flowchart of FIG. 2 is repeatedly executed at a predetermined cycle by the control device 22.

Figure 3:
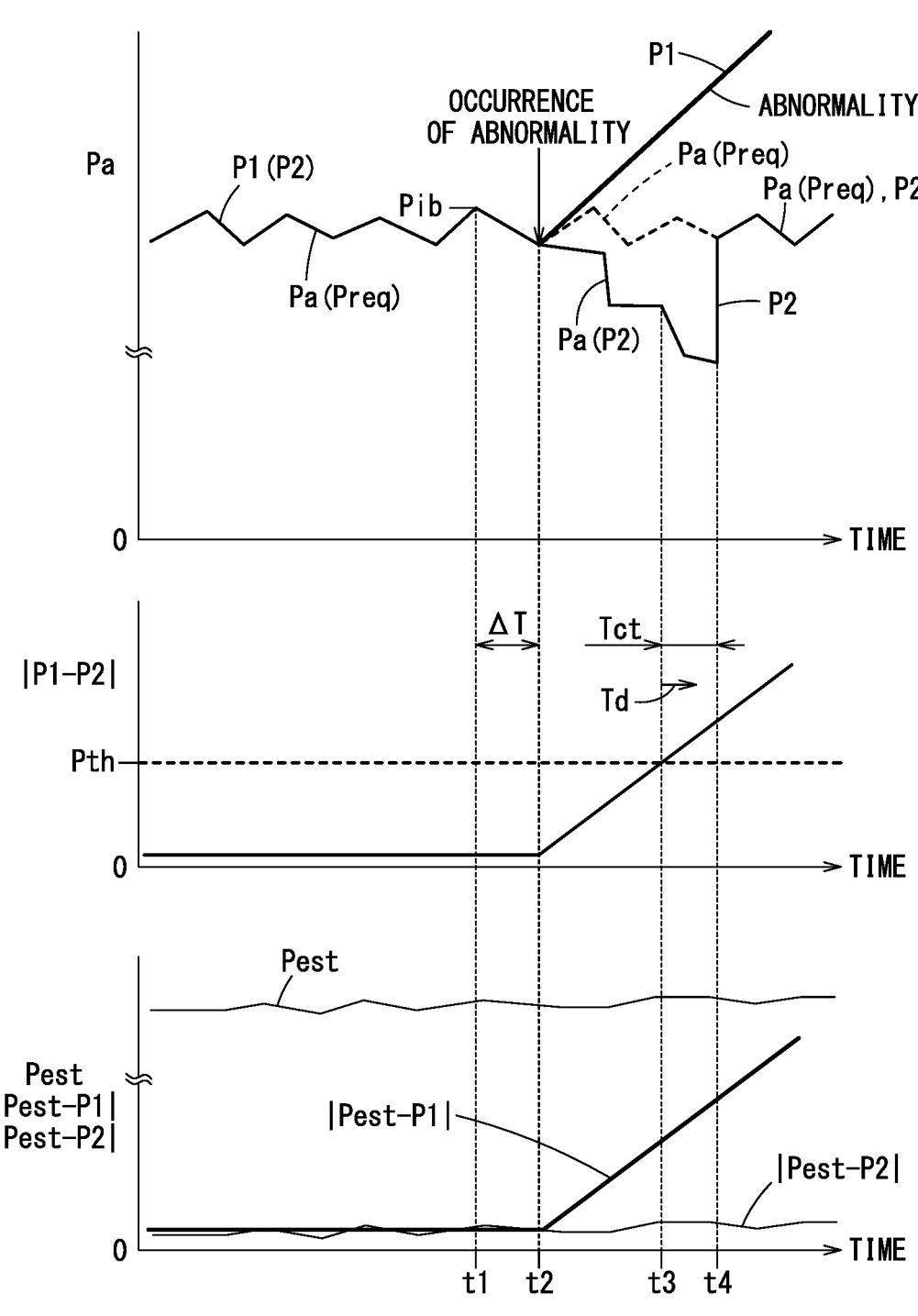
FIG. 3 is a timing chart for explaining the operation of the fuel cell system.

To facilitate understanding, FIG. 3 is also referred to for a timing chart as an example of the case where the fuel cell stack 14 continues the power generation operation.

Here, the contents of the timing chart will be briefly described.

The timing chart in the upper part of FIG. 3 shows waveform examples of the anode pressure Pa and the like.

The timing chart in the middle part of FIG. 3 shows the difference between the pressure value P1 detected by the pressure detector 51 and the pressure value P2 detected by the pressure detector 52. The control device 22 detects the difference as an absolute value |P1−P2| of the difference between the pressure value P1 and the pressure value P2.

The timing chart in the lower part of FIG. 3 shows a pressure estimation value Pest and the like of the anode pressure Pa continuously calculated by the control device 22.

In step S1 of FIG. 2, the control device 22 determines whether the power switch 62 is in an ON state or not (OFF state).

If the power switch 62 is in the OFF state (step S1: NO), the control device 22 ends the processing, and the fuel cell system 10 is brought into a stopped state.

If the power switch 62 is in the ON state (step S1: YES), the control device 22 performs power generation control (normal power generation operation of the fuel cell system 10) in step S2.

That is, the control device 22 calculates a demanded power Preq of the load 12 to be generated by the fuel cell stack 14. For example, if the load 12 is a motor of a fuel cell vehicle, the demanded power Preq is calculated on the basis of an accelerator degree of opening or the like. Then, the control device 22 controls the oxygen-containing gas supply device 18 including the compressor 24 and the fuel gas supply device 20 including the high pressure container 16 and the pressure regulators 32 such that the generated electric power Pfc (Pfc=Ifc×Vfc) of the fuel cell stack 14 becomes equal to the calculated demanded power Preq.

In this case, the control device 22 regulates the flow rate (pressure) of the oxygen-containing gas supplied to the fuel cell stack 14 by controlling the rotational speed of the compressor 24, and regulates the flow rate (anode pressure Pa) of the fuel gas supplied to the fuel cell stack 14 by controlling the ON duty of the pressure regulator 32 in accordance with the amount of the demanded power Preq. Then the control proceeds to the failure detection confirmation (determination) process of step S3.

In step S3, the control device 22 measures the pressure of the fuel gas in the fuel gas supply pipe 56 as the pressure values P1 [Pa] and P2 [Pa] by the pressure detectors 51 and 52, respectively. Each measured value is recorded in a storage device 65 of the control device 22 as a pressure data history.

In step S3, the control device 22 makes a determination or evaluation based on following inequality (2). That is, it is determined whether or not the difference |P1−P2| between the pressure values P1 and P2 measured by the respective pressure detectors 51 and 52 is equal to or greater than a predetermined value Pth (predetermined fluctuation threshold value) that is a failure detection threshold value (abnormality detection threshold value), which has been set and recorded in advance in the storage device 65 (see the middle diagram of FIG. 3).

$$|P1-P2| \geq Pth \tag{2}$$

If there is no failure in the pressure detectors 51 and 52 (i.e., when the pressure detectors 51 and 52 are normal), the pressure value P1 and the pressure value P2 are substantially equal to each other. Therefore, the evaluation of the above inequality (2) becomes false (step S3: NO).

In this case, the control device 22 returns the processing to step S1 via steps S10 and S11, and continues the above-described normal power generation operation in step S2 through the determination of step S1: YES.

When the normal power generation operation is continued in step S2, it is determined in step S10 whether or not a later-described process of limiting the generated electric power Pfc (generated current Ifc) in step S5 is continuing. If the limiting process is continuing (step S10: YES), the limiting process is canceled in step S11 and the process returns to step S1, and if the limiting process is not continuing (step S10: NO), the process returns to step S1.

In the determination of step S3, when either the pressure detector 51 or the pressure detector 52 is in a failure state (abnormality occurrence time point t2 in FIG. 3), and the difference |P1−P2| increases as shown between time point t2 and time point t3 in the middle diagram of FIG. 3, and the evaluation of "|P1−P2|≥Pth" becomes true (step S3: YES) (see failure detection time point t3 in FIG. 3), it is determined that there is a possibility that either the pressure detector 51 or the pressure detector 52 is in failure, and the process proceeds to a failure detection confirmation process of step S4.

In step S4, the control device 22 causes the timing unit 64 to start a preset down measurement from the failure detection time point t3 (the time point at which the evaluation of true in step S3 is established) to the failure confirmation time point t4 that is the time point at which specified time Tct, serving as failure determination confirmation time recorded in advance in the storage device 65, has elapsed. It should be noted that if down counting is being performed in following order: step S4 (NO)→step S5→step S3 (YES)→step S4, the time counting by the timing unit 64 is continued.

That is, in step S4, the control device 22 determines whether the elapsed time (referred to as elapsed time Td) from the failure detection time point t3 in step S3 is equal to or longer than the specified time Tct.

If the elapsed time Td is less than the specified time Tct (step S4: NO), the process proceeds to step S5.

In step S5, the control device 22 performs a process of limiting a fluctuation in the difference |P1−P2| caused by a fluctuation in the demanded power Preq due to a fluctuation in the load 12.

To be specific, point of time starting the time measurement in order to accurately and quickly determine the failure of the pressure detector 51 or the pressure detector 52, the control device 22 limits the fluctuation amount ΔPfc $(\Delta Pfc \approx \Delta Ifc \times Vfc)$ of the generated electric power Pfc ($Pfc = Ifc \times Vfc$) after the failure detection time point t3 which is a point of time starting the time measurement.

Therefore, the control device 22 limits the fluctuation amount $\Delta Ifc$ [A/sec], which is the temporal fluctuation amount of the generated current Ifc measured by the current detector 112, to be equal to or less than the predetermined fluctuation threshold value $\Delta Ifcth$ [A/sec], which is predetermined and recorded in the storage device 65, and then proceeds to step S3.

Actually, in the process of step S5, if the demanded power Preq of the load 12 becomes greater so as to correspond to a higher load, than the demanded power Preq at the failure detection time point t3 which is the point of time starting the time measurement, the control device 22 increases the generated electric power Pfc within a range in which the fluctuation amount $\Delta Ifc$ [A/sec] is equal to or less than $\Delta Ifcth$ [A/sec], and supplies it to the load 12. If the demanded power Preq becomes lower than the power at the failure detection time point t3, the control device 22 does not change the generated electric power Pfc and charges a storage device such as a battery (not shown) with the surplus generated electric power. If the storage battery cannot absorb (be charged with) the surplus generated electric power, the power generation of the fuel cell stack 14 is limited to a low load constant generated electric power.

Alternatively, during continuation of the limiting process of step S5, the generated electric power Pfc of the fuel cell stack 14 may not be changed, and the fluctuation in the demanded power Preq may be absorbed by the charge/discharge power of the electric storage device.

In step S3, the failure detection confirmation process is performed again. In this case, for example, in the case where the pressure value P1 detected by the pressure detector 51 temporarily increases due to impulsive noise or the like, the evaluation in step S3 by the control device 22 becomes false (step S3: NO), and the power generation control in the normal power generation operation is continued in order of step S10 (NO) (or step S10 (YES)→step S11)→step S1 (YES)→step S2.

On the other hand, if the evaluation of true in step S3 (step S3: YES) continues, in step S4, the control device 22 determines whether or not the elapsed time Td from the point of time (which is the failure detection time point t3 at which the abnormality determination in step S3 is established) starting the time measurement of down counting by the timing unit 64, is equal to or longer than the specified time Tct.

The control device 22 sets a point of time when the elapsed time Td becomes equal to or longer than the specified time Tct (step S4: YES) as the failure confirmation time point t4 (see FIG. 3), and advances the processing to step S6.

In step S6, an estimated pressure value Pest in following equation (3) is referred to, and the process proceeds to step S7 after the reference.

As shown in the lower diagram of FIG. 3, the estimated pressure value Pest is continuously calculated during the power generation operation of the fuel cell stack 14. In the case where a calculation load (computational load) of the estimated pressure value Pest by the control device 22 is large, the estimated pressure value Pest may be calculated at the failure confirmation time point t4.

As shown in equation (3), "the estimated pressure value=the pressure value at the abnormality occurrence time point t2−the pressure fluctuation amount due to the consumption of the fuel gas+the pressure fluctuation amount due to the supply of the fuel gas".

$$Pest = Pib - Pgc + Pgs \qquad (3)$$

Here, the pressure value Pib at the abnormality occurrence time point t2 may be a pressure value Pib (the upper diagram of FIG. 3) at time point t1 of estimated pressure value calculation, which is a time point immediately before the abnormality occurrence time point t2, and also which is the time point going back a certain period $\Delta T$ (the middle diagram of FIG. 3) that is a predetermined short time period, from the abnormality occurrence time point t2.

The pressure value P1 of the pressure detector 51 and the pressure value P2 of the pressure detector 52 start to deviate from each other at the abnormality occurrence time point t2. However, since there is originally a deviation between the pressure values P1 and P2 due to an offset between the pressure detector 51 and the pressure detector 52, it is preferable to adopt the estimated pressure value Pest at the estimated pressure value calculation time point t1 that is a time point before the abnormality occurrence time point t2 (the lower diagram of FIG. 3) by the predetermined time (minute time) $\Delta T$, in order to remove the influence of the deviation.

In equation (3), the pressure fluctuation amount Pgc due to the consumption of the fuel gas is calculated based on: a total hydrogen consumption amount including a fuel gas consumption amount in the fuel cell stack 14 contributing to the generated electric power Pfc of the fuel cell stack 14, a membrane-permeated fuel gas amount from the anode flow field 42 to the cathode flow field 40 through the membrane electrode assembly 46 based on the pressure difference, and a fuel gas amount when the drain valve 60 is opened; and an anode volume (the volume of the anode flow field 42 in the fuel cell stack 14 and the volume including the fuel gas pipe or the like from the fuel gas outlet connection port 104 to the fuel gas inlet connection port 103), as well as referring to the gas state equation.

In equation (3), the pressure fluctuation amount Pgs due to the supply of the fuel gas is calculated based on the amount of the fuel gas discharged from the pressure regulator 32.

The accuracy of the pressure fluctuation amount Pgc due to consumption of the fuel gas and the pressure fluctuation amount Pgs due to supply of the fuel gas can be further improved by correcting the pressure fluctuation amount Pgc and the pressure fluctuation amount Pgs based on the temperature Ta of the fuel gas in the fuel gas supply pipe 56 measured by the temperature detector 50.

In this case, the temperature Ta of the fuel gas in the fuel gas supply pipe 56 may be replaced by a measured temperature of a heat exchange medium (not shown) for cooling the fuel cell stack 14.

In step S7, the control device 22 specifies (determines) the failed pressure detector 51 or 52, in other words, the normal pressure detector 51 or 52 by following inequality (4).

$$|Pest - P1| > |Pest - P2| \qquad (4)$$

That is, it is determined that the pressure detector 51 or 52 having a greater difference ($|Pest - P1|$ or $|Pest - P2|$) between the pressure value P1 or P2 of the pressure detector 51 or 52 and the estimated pressure value Pest is faulty.

If the difference $|Pest - P1|$ between the estimated pressure value P1 detected by the pressure detector 51 and the pressure estimated value Pest is greater than the difference $|Pest - P2|$ between the pressure value P2 detected by the pressure detector 52 and the pressure estimated value Pest (step S7: YES), it is determined that the pressure detector 51 has failed, and the process proceeds to step S8.

In step S8 and hereafter, the control device 22 continues the normal power generation operation (emergency power generation operation) of the fuel cell stack 14 based on the pressure value P2 of the pressure detector 52 that has been determined to be normal. That is, the process proceeds from step S1 (YES) to step S2 (S1 (YES)→S2). In this case, in step S8, the control device 22 changes or rewrites the pressure value P1 of the pressure detector 51 determined to be faulty, into the pressure value P2, such that the power generation control in step S2 is continued while the evaluation in step S3 is false.

On the other hand, when the difference |Pest–P1| between the pressure value P1 detected by the pressure detector 51 and the estimated pressure value Pest is smaller than the difference |Pest–P2| between the pressure value P2 detected by the pressure detector 52 and the estimated pressure value Pest (step S7: NO), it is determined that the pressure detector 52 has failed, and the process proceeds to step S9.

In step S9, the control device 22 continues the normal power generation operation (emergency power generation operation) based on the detected pressure value P1 of the pressure detector 51. That is, the process proceeds from step S1 (YES) to step S2 (S1 (YES)→S2). In this case, the pressure value P2 of the pressure detector 52 determined to be faulty is changed or rewritten into the pressure value P1.

When the determination result of step S7 is found, the failed pressure detector 51 or 52 is displayed on a display device (not shown) to prompt the user to troubleshoot the failure. In addition, a dealer or the like may be notified of information of the failed pressure detector 51 or 52 via communication to be informed that the fuel cell system 10 is in an emergency power generation operation.

When returning from step S8 or step S9 to step S1, the control device 22 may set a failure flag Ff of the failed pressure detector 51 or 52 at step S8 or S9 so as not to proceed from step S2 to step S3, refer to the failure flag Ff at step S2, and if the failure flag Ff is set, control may be performed so as to return to step S1.

In the above-described embodiment in which the program according to the flowchart of FIG. 2 is executed, when either the pressure detector 51 or the pressure detector 52 is in a failure state (abnormality occurrence time point t2 in FIG. 3) and the above-described difference |P1–P2| increases as shown in between time point t2 and time point t3 in the middle diagram of FIG. 3 and the evaluation of "|P1–P2|≥Pth" becomes true (step S3: YES) (see failure detection time point t3 in FIG. 3), it is estimated that there is a possibility that either the pressure detector 51 or the pressure detector 52 is in failure. Then, from the failure detection time point t3 as failure possibility estimation time to the failure confirmation time point t4 as the elapse time of the specified time Tct as the failure determination confirmation time, the fluctuation amount ΔIfc of the generated current Ifc related to the generated electric power Pfc (Pfc=Vfc×Ifc) is uniformly limited to the predetermined fluctuation threshold value ΔIfcth [A/sec] or less in step S5.

However, the uniform limitation causes the following problem. This problem will be described with reference to the timing chart of FIG. 4. It is assumed that after the abnormality occurrence time point t2, as shown in the upper diagram of FIG. 4, an increase or decrease in the load 12, for example, in the case where the load 12 is a motor of a fuel cell vehicle, an increase or decrease amount of demanded power Preq becomes large due to acceleration, deceleration, or the like based on an accelerator operation.

In this way, if the fluctuation (output fluctuation) of the generated electric power Pfc of the fuel cell stack 14 is large, the pressure fluctuation of the anode pressure Pa, which is a pressure value of the fuel gas supply pipe 56, becomes large, and there is a possibility that failure detection cannot be confirmed.

Figure 4:
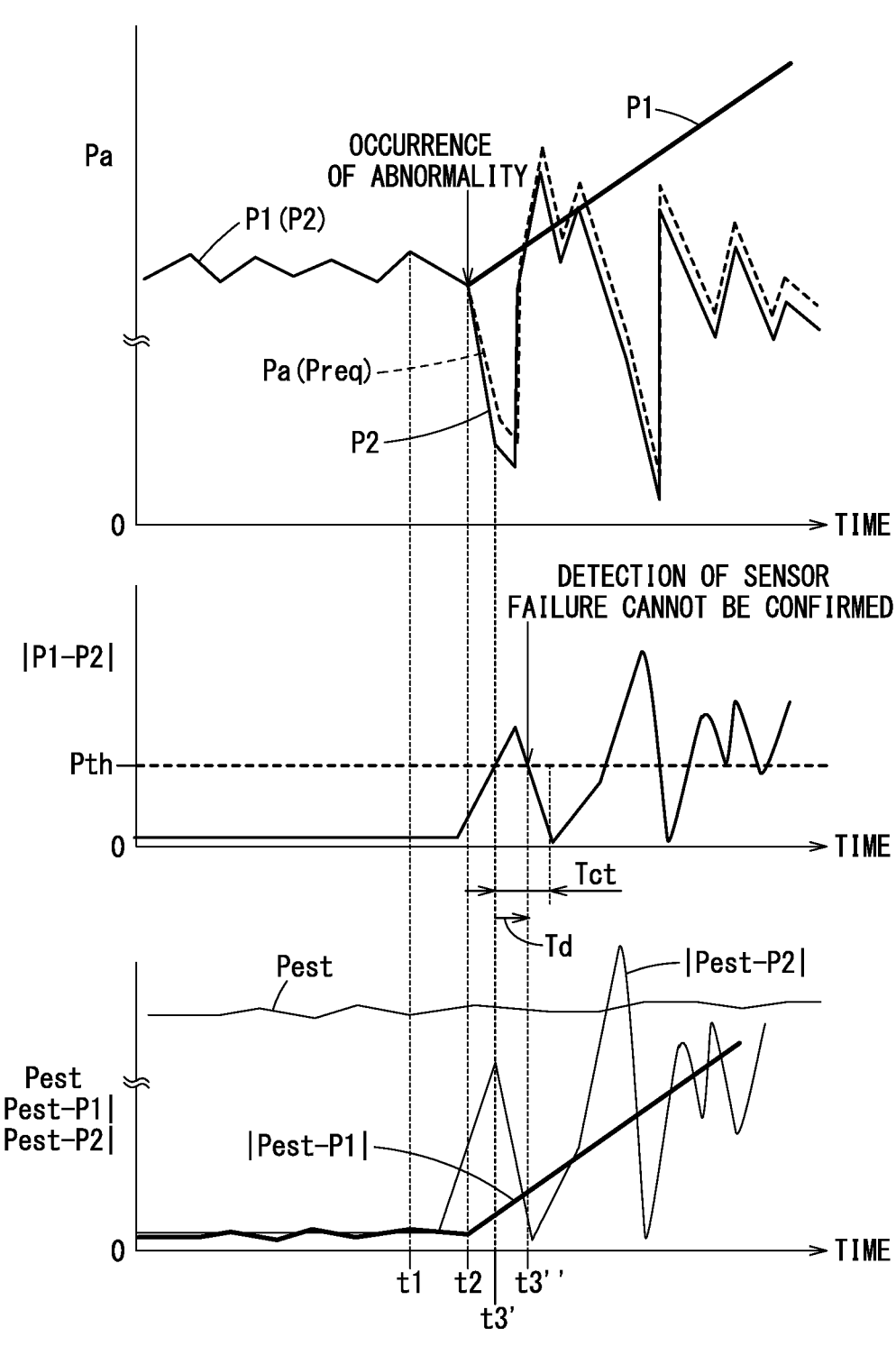
FIG. 4 is a timing chart for explaining a problem.

That is, as shown in the middle and lower diagrams of FIG. 4, even if the evaluation of "|P1–P2|≥Pth" becomes true (step S3: YES) at time point t3', a value |P1–P2| becomes smaller than the failure detection threshold value Pth ("|P1–P2|<Pth") before the specified time Tct elapses. For this reason, in fact, failure detection cannot be confirmed even though the pressure detector 51 has failed.

In this case, in the above-described embodiment, when the difference |P1–P2| exceeds the failure detection threshold value Pth and the evaluation of "P1–P2≥Pth" becomes true (step S3: YES), the fluctuation amount ΔIfc of the generated current Ifc related to the generated electric power Pfc (Pfc=Vfc×Ifc) is limited to be equal to or less than the predetermined value ΔIfcth [A/sec] as a predetermined fluctuation threshold value in step S5. Therefore, after the time point t3', the fluctuation amount of the anode pressure Pa is limited, the failure detection can be confirmed, and the normal power generation operation (emergency power generation operation) in step S2 can be continued.

If the determination in step S3 is not established before the specified time Tct, which is the failure determination confirmation time, elapses, the limitation is released in step S11 and the normal power generation operation is continued.

[Modifications]

The above-described embodiment can be modified in the following manner.

FIG. 5 is a flowchart for explaining an operation of a modification.

In FIG. 5, the same step numbers are used to designate corresponding steps to those shown in FIG. 2, and detailed description of such steps is omitted.

In the flowchart of FIG. 5, in contrast to the flowchart of FIG. 2, the determination processing of step S21 is added when the evaluation of step S4 is false.

In the determination process of step S21, the control device 22 determines whether or not the fluctuation amount ΔIfc of the generated current Ifc is equal to or less than a threshold value ΔIfcth as the predetermined fluctuation threshold value before limiting the fluctuation amount ΔPfc (ΔPfc≈ΔIfc×Vfc) of the generated electric power Pfc (Pfc=Ifc×Vfc) in step S5.

If the fluctuation amount ΔIfc exceeds the threshold value ΔIfcth (step S21: NO), the fluctuation amount ΔIfc is limited to the threshold value ΔIfcth or less in step S5, in a similar manner to the embodiment. However, if the fluctuation amount ΔIfc is less than the threshold value ΔIfcth (step S21: YES), the failure detection confirmation processing of step S3 and step S4 is continued while continuing the normal power generation operation (step S2) in which the fluctuation amount ΔIfc is not limited in order of step S10 (step S11)→step S1 (YES)→step S2.

According to this modification, when the load 12 is increased or decreased, for example, in the case where the load 12 is a motor of a fuel cell vehicle, and if the fluctuation in acceleration/deceleration or the like based on the accelerator operation is small and the amount of increase or decrease in the demanded power Preq to be generated is small, the power generation operation of the fuel cell stack 14 can be continued in accordance with the amount of increase or decrease. Thus, drivability of the vehicle is not impaired at all.

Invention that can be Obtained from Embodiment
and Modifications

Hereinafter, inventions that can be obtained from the above-described embodiment and the modifications thereof will be described below. Although to facilitate understanding, the constituent elements are partially designated by the reference numerals used in the above-described embodiment and modification, the constituent elements are not limited to those elements to which such reference numerals are applied.

(1) The fuel cell system 10 according to the present invention includes the fuel cell stack 14 configured to generate electric power by an electrochemical reaction between an oxygen-containing gas and a fuel gas. The system includes the high pressure container 16 in which the fuel gas having high pressure is stored, the pressure regulator 32 configured to regulate pressure of the fuel gas discharged from the high pressure container and supply the regulated fuel gas to the fuel cell stack via the fuel gas supply pipe 56, the plurality of pressure detectors 51, 52 provided at the fuel gas supply pipe and each configured to measure the pressure of the fuel gas in the fuel gas supply pipe, and the control device 22 configured to control the pressure regulator, wherein in a case where a difference between pressure values P1, P2 detected by the plurality of pressure detectors is equal to or greater than a predetermined value (step S3: YES), the control device estimates a pressure value in the fuel gas supply pipe based on a supply situation of the fuel gas supplied from the pressure regulator to the fuel cell stack and a consumption situation of the fuel gas in the fuel cell stack, and determines that the pressure detector detecting a pressure value closer to the estimated pressure value Pest is a normal pressure detector, and thereafter continues a power generation operation of the fuel cell stack based on the pressure value of the pressure detector determined to be normal.

According to this configuration, if the difference between the pressure values detected by the plurality of pressure detectors is equal to or greater than the predetermined value, in other words, if either of the pressure detectors transitions to an abnormal state, a normal pressure detector can be accurately determined by comparing the respective pressure values detected by the plurality of pressure detectors with the estimated pressure value estimated based on the supply situation of the fuel gas to the fuel cell stack and the consumption situation of the fuel gas in the fuel cell stack.

If any of the pressure detectors among the plurality of pressure detectors transitions to an abnormal state, the power generation operation of the fuel cell system can be continued using a normal pressure detector. This in turn contributes to energy efficiency.

(2) Further, in the fuel-cell system, if the difference between the pressure values detected by the plurality of pressure detectors is equal to or greater than the predetermined value, the control device may limit the fluctuation amount of the power generation output of the fuel cell stack during less than a specified time Tct until the normal pressure detector is determined (step S5).

In this way, by limiting the fluctuation amount of the power generation output of the fuel cell stack, the calculation accuracy of the estimated pressure value can be improved. Moreover, it is possible to calculate a highly accurate estimated pressure value in a short time.

(3) Further, in the fuel cell system, if the difference between the pressure values detected by the plurality of pressure detectors is equal to or greater than the predetermined value, and the fluctuation amount of the power generation output of the fuel cell stack is equal to or greater than the specified value (predetermined value), the control device may limit the fluctuation amount of the power generation output of the fuel cell stack (step S5) until the normal pressure detector is determined (step S4: YES).

As described above, if the fluctuation amount of the power generation output of the fuel cell stack is less than the specified value (predetermined value), the fluctuation amount of the power generation output of the fuel cell stack is not limited. Therefore, for example, it is possible to suppress a limitation on drivability of a fuel cell vehicle or the like on which the fuel cell system is mounted.

(4) Furthermore, in the fuel cell system, the power generation output of the fuel cell stack may be calculated on a basis of the generated current Ifc of the fuel cell stack, and the fluctuation amount $\Delta$Ifc [A/sec] of the generated current per unit time may be used as the fluctuation amount of the power generation output of the fuel cell stack.

Thus, the power generation output of the fuel cell stack and the fluctuation amount of the power generation output can be calculated easily and with high accuracy.

(5) Further still, in the fuel cell system, the pressure data history of each of the plurality of pressure detectors may be continuously logged going back a predetermined period $\Delta$T from current time, if the difference between the pressure values detected by the plurality of pressure detectors is equal to or greater than the predetermined value, the control device may calculate the estimated pressure value obtained by estimating the pressure value in the fuel gas supply pipe based on the supply situation of the fuel gas supplied from the pressure regulator to the fuel cell stack and the consumption situation of the fuel gas in the fuel cell stack, the estimated pressure value may be calculated by subtracting a pressure value based on the consumption situation of the fuel gas from a past pressure value based on the pressure data history before a time point at which a difference between the pressure values detected by the plurality of pressure detectors becomes equal to or greater than the predetermined value, and adding thereto a pressure value based on the supply situation of the fuel gas (equation (3)).

Thus, the estimated pressure value is obtained by adding the pressure value based on the supply situation of the fuel gas (an increased amount of pressure value due to supply of the fuel gas) to the pressure value deemed to be normal detected by the plurality of pressure detectors, which is the past pressure value based on the pressure data history before the time point at which the difference between the pressure values detected by the plurality of pressure detectors becomes equal to or greater than the predetermined value and by subtracting therefrom the pressure value based on the consumption situation of the fuel gas (a decreased amount of pressure value due to consumption of the fuel gas). Thus, accuracy in estimation of estimated pressure value can be improved.

(6) Furthermore, in the fuel cell system, the past pressure value immediately before the time point (t2) at which the difference between the pressure values detected by the plurality of pressure detectors becomes equal to or greater than the predetermined value may be used as the past pressure value based on the pressure data history before the time point at which the difference between the pressure values detected by the plurality of pressure detectors becomes equal to or greater than the predetermined value.

Thus, since the estimated pressure value is estimated based on the pressure value immediately before the abnormality occurrence time point, accuracy in estimation can be improved.

The present invention is not limited to the above-described embodiment, and various configurations could be adopted therein without deviating from the essence and gist of the present invention.

The invention claimed is:

1. A fuel cell system including a fuel cell stack configured to generate electric power by an electrochemical reaction between an oxygen-containing gas and a fuel gas, the system comprising:

a high pressure container in which the fuel gas having high pressure is stored;

a pressure regulator configured to regulate pressure of the fuel gas discharged from the high pressure container and supply the regulated fuel gas to the fuel cell stack via a fuel gas supply pipe;

a plurality of pressure detectors provided at the fuel gas supply pipe and each configured to measure the pressure of the fuel gas in the fuel gas supply pipe; and one or more processors that execute computer-executable instructions stored in a memory, wherein the one or more processors execute the computer executable instructions to cause the fuel cell system to:

control the pressure regulator;

in a case where a difference between pressure values detected by the plurality of pressure detectors is equal to or greater than a predetermined value, estimate a pressure value in the fuel gas supply pipe based on a supply situation of the fuel gas supplied from the pressure regulator to the fuel cell stack and a consumption situation of the fuel gas in the fuel cell stack; and determine that a pressure detector detecting a pressure value closer to an estimated pressure value is a normal pressure detector, and thereafter continue a power generation operation of the fuel cell stack based on the pressure value of the pressure detector determined to be normal, and wherein if the difference between the pressure values detected by the plurality of pressure detectors is equal to or greater than the predetermined value, the fuel cell system limits a fluctuation amount of power generation output of the fuel cell stack during less than a specified time until the normal pressure detector is determined.

2. A fuel cell system including a fuel cell stack configured to generate electric power by an electrochemical reaction between an oxygen-containing gas and a fuel gas, the system comprising:

a high pressure container in which the fuel gas having high pressure is stored;

a pressure regulator configured to regulate pressure of the fuel gas discharged from the high pressure container and supply the regulated fuel gas to the fuel cell stack via a fuel gas supply pipe;

a plurality of pressure detectors provided at the fuel gas supply pipe and each configured to measure the pressure of the fuel gas in the fuel gas supply pipe; and one or more processors that execute computer-executable instructions stored in a memory, wherein the one or more processors execute the computer executable instructions to cause the fuel cell system to:

control the pressure regulator;

in a case where a difference between pressure values detected by the plurality of pressure detectors is equal to or greater than a predetermined value, estimate a pressure value in the fuel gas supply pipe based on a supply situation of the fuel gas supplied from the pressure regulator to the fuel cell stack and a consumption situation of the fuel gas in the fuel cell stack; and determine that a pressure detector detecting a pressure value closer to an estimated pressure value is a normal pressure detector, and thereafter continue a power generation operation of the fuel cell stack based on the pressure value of the pressure detector determined to be normal, and wherein if the difference between the pressure values detected by the plurality of pressure detectors is equal to or greater than the predetermined value, and a fluctuation amount of power generation output of the fuel cell stack is equal to or greater than a specified value, the fuel cell system limits the fluctuation amount of power generation output of the fuel cell stack until the normal pressure detector is determined.

3. A fuel cell system including a fuel cell stack configured to generate electric power by an electrochemical reaction between an oxygen-containing gas and a fuel gas, the system comprising:

a high pressure container in which the fuel gas having high pressure is stored;

a pressure regulator configured to regulate pressure of the fuel gas discharged from the high pressure container and supply the regulated fuel gas to the fuel cell stack via a fuel gas supply pipe;

a plurality of pressure detectors provided at the fuel gas supply pipe and each configured to measure the pressure of the fuel gas in the fuel gas supply pipe; and one or more processors that execute computer-executable instructions stored in a memory, wherein the one or more processors execute the computer executable instructions to cause the fuel cell system to:

control the pressure regulator;

in a case where a difference between pressure values detected by the plurality of pressure detectors is equal to or greater than a predetermined value, estimate a pressure value in the fuel gas supply pipe based on a supply situation of the fuel gas supplied from the pressure regulator to the fuel cell stack and a consumption situation of the fuel gas in the fuel cell stack; and determine that a pressure detector detecting a pressure value closer to an estimated pressure value is a normal pressure detector, and thereafter continue a power generation operation of the fuel cell stack based on the pressure value of the pressure detector determined to be normal, and wherein if the difference between the pressure values detected by the plurality of pressure detectors is equal to or greater than the predetermined value, the fuel cell system limits a fluctuation amount of power generation output of the fuel cell stack during less than a specified time until the normal pressure detector is determined.

4. The fuel cell system according to claim 1, wherein the fuel cell system calculates the power generation output of the fuel cell stack on a basis of a generated current of the fuel cell stack, and uses a fluctuation amount of the generated current per unit time as the fluctuation amount of the power generation output of the fuel cell stack.

5. The fuel cell system according to claim 2, wherein the fuel cell system calculates the power generation output of the fuel cell stack on a basis of a generated current of the fuel cell stack, and uses a fluctuation amount of the generated current per unit time as the fluctuation amount of the power generation output of the fuel cell stack.

6. A fuel cell system including a fuel cell stack configured to generate electric power by an electrochemical reaction between an oxygen-containing gas and a fuel gas, the system comprising:

a high pressure container in which the fuel gas having high pressure is stored;

a pressure regulator configured to regulate pressure of the fuel gas discharged from the high pressure container and supply the regulated fuel gas to the fuel cell stack via a fuel gas supply pipe;

a plurality of pressure detectors provided at the fuel gas supply pipe and each configured to measure the pressure of the fuel gas in the fuel gas supply pipe; and one or more processors that execute computer-executable instructions stored in a memory, wherein the one or more processors execute the computer executable instructions to cause the fuel cell system to:

control the pressure regulator;

in a case where a difference between pressure values detected by the plurality of pressure detectors is equal to or greater than a predetermined value, estimate a pressure value in the fuel gas supply pipe based on a supply situation of the fuel gas supplied from the pressure regulator to the fuel cell stack and a consumption situation of the fuel gas in the fuel cell stack; and determine that a pressure detector detecting a pressure value closer to an estimated pressure value is a normal pressure detector, and thereafter continue a power generation operation of the fuel cell stack based on the pressure value of the pressure detector determined to be normal, and wherein the fuel cell system continuously logs pressure data history of each of the plurality of pressure detectors going back a predetermined period from current time, if the difference between the pressure values detected by the plurality of pressure detectors is equal to or greater than the predetermined value, the processor calculates the estimated pressure value obtained by estimating the pressure value in the fuel gas supply pipe based on the supply situation of the fuel gas supplied from the pressure regulator to the fuel cell stack and the consumption situation of the fuel gas in the fuel cell stack, the estimated pressure value is calculated by subtracting a pressure value based on the consumption situation of the fuel gas from a past pressure value based on the pressure data history before a time point at which a difference between the pressure values detected by the plurality of pressure detectors becomes equal to or greater than the predetermined value, and adding thereto a pressure value based on the supply situation of the fuel gas.

7. The fuel cell system according to claim 6, wherein the fuel cell system uses a past pressure value immediately before the time point at which the difference between the pressure values detected by the plurality of pressure detectors becomes equal to or greater than the predetermined value, as the past pressure value based on the pressure data history before the time point at which the difference between the pressure values detected by the plurality of pressure detectors becomes equal to or greater than the predetermined value.

* * * * *